United States Patent [19]

Deyrup

[11] 3,900,689

[45] Aug. 19, 1975

[54] SUBSTRATES TREATED WITH CHROMIUM(III) COMPLEXES TO INCREASE THE ADHESION OF ORGANIC POLYMERS THERETO

[75] Inventor: Alden J. Deyrup, West Chester, Pa.

[73] Assignee: E. I. Du Pont de Nemours and Company, Wilmington, Del.

[22] Filed: June 25, 1973

[21] Appl. No.: 373,145

Related U.S. Application Data

[60] Division of Ser. No. 210,833, Dec. 22, 1971, Pat. No. 3,787,326, which is a continuation-in-part of Ser. No. 119,608, March 1, 1971, abandoned, which is a continuation-in-part of Ser. No. 25,097, April 2, 1970, abandoned.

[52] U.S. Cl. ............... 428/432; 427/300; 427/299; 427/327; 427/384; 427/388; 427/444; 427/409; 156/326; 428/441; 428/461; 428/469; 428/457; 428/500; 428/515

[51] Int. Cl.... B32b 15/04; B32b 17/06; B32b 27/06

[58] Field of Search ............. 260/438.5 R, 438.5 C; 117/72, 75, 121, 124 B, 124 D, 126 GF, 120 GQ, 127; 156/326; 161/182, 183, 189, 192, 213, 227, 231, 247, 255, 256

[56] References Cited
UNITED STATES PATENTS

| | | | |
|---|---|---|---|
| 2,744,835 | 5/1956 | Caroselli | 117/126 GQ |
| 2,951,739 | 9/1960 | Roff | 117/126 GQ |
| 3,107,198 | 10/1963 | Amborski | 117/127 |
| 3,375,263 | 3/1968 | Trebilcock | 117/126 GQ |
| 3,804,802 | 4/1974 | Bergner | 117/126 GF |

*Primary Examiner*—William D. Martin
*Assistant Examiner*—William H. Schmidt

[57] ABSTRACT

Coordination complexes of chromium (III) and fumaric acid and certain substituted fumaric acids; the preparation of aqueous solutions of such complexes; and the use of such solutions for treating metal, metal oxide and glass substrates for the purpose of improving the bonding thereto of subsequently applied organic polymer adhesives. Preferred coordination compounds of fumaric acid have the approximate formulas $[Cr(H_2O)_5(C_4H_3O_4)]_nX_2$, $[Cr(H_2O)_4(C_4H_2O_4)]_nX$, and $[Cr_2(H_2O)_{10}(C_4H_2O_4)]_nX_4$, where X is a noncoordinated anion and a is its valence. The preferred anion is nitrate. Also a method for treating substrates to improve adhesion of polymers thereto, by contacting the substrate with an aqueous solution of fumaric acid or certain substituted fumaric acids and a $Cr^{+3}$ salt which yields the $Cr(H_2O)_6^{+3}$ ion, at 90°–100°C. and a pH of 1.8–2.4.

30 Claims, 2 Drawing Figures

FIG. 1

SUBSTRATES TREATED WITH CHROMIUM(III) COMPLEXES TO INCREASE THE ADHESION OF ORGANIC POLYMERS THERETO

CROSS-REFERENCE TO RELATED APPLICATIONS

The application is a division of application Ser. No. 210,833, filed Dec. 22, 1971, now U.S. Pat. 3,787,326. That application is a continuation-in-part of my application Ser. No. 119,608, filed Mar. 1, 1971, now abandoned, which in turn is a continuation-in-part of my application Ser. No. 25,097, filed Apr. 2, 1970, now abandoned. Each of those applications is assigned to the assignee of the present application.

BACKGROUND

1. Field of the Invention

This invention relates to certain chromium (III) coordination complexes and their preparation. It also relates to the use of aqueous solutions of such complexes in treating base metal, metal oxide and glass substrates preparatory to the application to such substrates of organic polymer coatings for the purpose of improving the adhesive bond between such coatings and the substrates. It also relates to aqueous solutions of $Cr(H_2O)_6^{3+}$ and certain acids for such treatments.

2. Prior Art

Coordination complexes of chromium (III) with certain dibasic acids such as oxalic acid, malonic acid and tartaric acid are known as indicated on pages 408-424 of Gmelins Handbuch der anorganischen Chemie, Chrom, Teil B - Verlag Chemie GMBH (1962). It is obvious from this Gmelins Handbuch citation that the chemistry of such complexes is complicated. So far as I am aware, no coordination complex of chromium (III) with fumaric acid has ever been made or reported in the literature.

Various organic polymers such as the polyolefins are not well suited for use as structural adhesives, e.g., for joining metal parts or for preparing durable protective or decorative coatings on metal or metal oxide substrates, because the adhesion obtained is not durable, particularly in the presence of moisture under stress conditions. Thus, although they offer advantages of low cost and latent advantages of strength, toughness and chemical inertness, the olefin polymers such as the polyethylene and polypropylenes are commonly known to adhere very poorly to metals. Various other polymers have been found to have limited uses as structural adhesives or as coatings for substrates because the adhesive bonds formed with the substrate are not as good as desired for many purposes.

It is well known to introduce carboxyl groups into polymers by grafting, copolymerization, etc., to improve their speed of adhesion, but this approach usually impairs physical strength and frequently worsens durability of the adhesive bond to such important reactive metals as steel, iron, copper, and the like. Various ways have been proposed for improving the adhesion of polyethylene to metals. Thus, Busse and Boxler, U.S. Pat. No. 2,838,437, propose incorporating in the polyethylene certain unsaturated organic acids or treating the polyethylene surface or the surface to be adhered thereto with such acid; Pines, U.S. Pat. No. 3,038,847, proposes applying prime coats of various aminoalkyl silicon compounds to metal surfaces prior to the application thereof of coatings of organic polymers; and Vincent, U.S. Pat. No. 3,466,207, proposes pretreating metal substrates with an aqueous solution of an aliphatic carboxylic acid, preferably following a treatment with an aqueous inorganic acid solution containing hexavalent chromium, prior to application of an olefin polymer to the metal substrate. However, the improvements resulting from such proposals are usually improvements in the speed of the development of adhesion (generally indicated by increases in peel and lap shear strengths reported with respect to freshly prepared test specimens), without any significant improvement in the durability of adhesion under stress in the presence of moisture. In some cases, the proposals for improving peel strength actually result in a worsening of the durability of adhesion under stress in the presence of moisture. Since a structural adhesive must be able to sustain substantial continuing stress in a predictable and dependable way in our humid world environment, mere acceleration of adhesion, while useful, is often of limited practical value unless the problem of poor durability of adhesion is or can also be solved. Similarly, protective or decorative polymer coatings on corrodible metals such as iron or steel are of limited practical value if the physical forces of rust growth can push the coating away from a scratch or flaw and thereby spread corrosive failure of the coating.

SUMMARY OF THE INVENTION

This invention relates to compositions comprising one or more water-soluble chromium (III) coordination complexes of (a) chromium (III) derived from a water soluble salt thereof with a noncoordinated anion, which salt yields the hexaaquochromic ion in water; with (b) a trans-acid of the formula wherein $R_1$ and $R_2$ are the same or different, and are either H, alkyl, —$CH_2COOH$ or phenyl; provided that the total number of carbon atoms in the trans-acid is an integer in the range 4–10, inclusive. Aqueous solutions of such compositions are also provided. The chromium (III) complex with said acid may be either an anion or a cation, or even neutral.

Among these compositions are those wherein the complex is a cation and the anion is noncoordinated to chromium. Among such complexes are those where the noncoordinated anion is monovalent and the approximate ratio of chromium (III) to acid (each in the cation complex) to noncoordinated anion is 1/1/2 or 1/1/1. Preferred trans-acids are fumaric and mesaconic acids, the most preferred trans-acid being fumaric acid; the preferred anion is nitrate.

Also among the complexes of this invention are those where the noncoordinated anion is monovalent and the approximate ratio of chromium (III) to acid (each in the cation complex) to noncoordinated monovalent anion is about 2/1/4. The preferred trans-acid is fumaric acid and the preferred anion is nitrate.

Where the acid is fumaric acid, complexes of at least two major varieties are identifiable by their spectral characteristics, although the composition of each may be variable. The first are those whose aqueous solutions have a purple blue color and give a characteristic broad band visible light absorption spectrum which has maxima at about 5700 to 5770A and about 4100 to 4200A. The second group are those which have a clear medium green color and give characteristics broad band light absorption spectrum having maxima at about 5800 to 5870A, at about 4300 to 4370A, and at about 3620A. These visible spectra were determined within one week of complex preparation.

Preferred compositions include those wherein the coordination compound is selected from the groups of compounds having the approximate formula $$[Cr(H_2O)_5(C_4H_2ZO_4)]_aX_2$$

or the approximate formula $$[Cr(H_2O)_4(C_4HZO_4)]_aX.$$

In the above approximate formulas

Z is H or $CH_3$,

X is a noncoordinated anion, preferably nitrate, and $a$ is the valence of X.

Embodiments of the invention are a composition comprising (A) a coordination compound comprising a coordination complex of chromium (III) and fumaric acid, the compound having the approximate formula $$[Cr(H_2O)_5(C_4H_3O_4)]X_2$$

(Type I)

wherein X is a noncoordinated anion such as the nitrate anion, and whose aqueous solutions have a purple blue color and give a characteristic broad band light absorption spectrum having two maxima, respectively, at about 5750A and 4120A; and (B) a coordination compound comprising a coordination complex of chromium (III) with fumaric acid, the compound having the approximate formula $$[Cr(H_2O)_4(C_4H_2O_4)]X$$

(Type II)

wherein X is as indicated above, and whose aqueous solutions have a strong clear medium green color and give a characteristic broad band light absorption spectrum having three maxima, respectively, at about 5850A, 4300A and 3620A.

Another preferred composition is a coordination compound having the approximate formula $$[Cr_2(H_2O)_{10}(C_4HZO_4)]_aX_4$$

(Type III).

wherein X is a noncoordinated anion, preferably nitrate, Z is H or $CH_3$ and $a$ is the valence of X. Where X is monovalent, the approximate formula is $[Cr_2(H_2O)_{10}(C_4HZO_4)]X_4$. In this preferred composition the molar ratio of fumaric acid to chromium is 0.5/1, although ratios in the range 0.4/1 to 0.6/1 are part of this embodiment. Aqueous solutions of III have a blue color and give a characteristic broad band light absorption spectrum having two maxima at about 4100A and 5700A, similar to the maxima disclosed above for Type I.

Another embodiment of the invention comprises the preparation of the above complexes or mixtures thereof, particularly in the form of aqueous solutions. Complexes of $Cr^{+3}$ with the above tans-acids may be prepared by either of the following processes. The first involves heating in an aqueous solution at about 70°–100°C. such a trans-acid and a chromium (III) salt which yields the hexaaguochromic ion, at a pH of about 0.2 to 1. The second method comprises heating in an aqueous solution at 70°–100°C. such a trans-acid and a chromium (III) salt which yields the hexaaguochromic ion, at a pH in the range from above 1 to 2.4. Specifically, the preparation of Type I involves heating in an aqueous solution at about 70° to 100°C. a chromium (III) salt which gives the hexaaguochromic ion, $Cr(H_2O)_6^{3+}$, with the fumaric acid or a water-soluble salt thereof which gives the hydrogen fumarate anion, $C_4H_3O_4^-$, or the fumaric anion, $C_4H_2O_4^{-2}$, at a pH of about 0.2 to about 1. The time of heating should be such that the resulting solution will give the absorption spectrum which is characteristic of aqueous solutions of Type I. The preparation of Type II involves heating in aqueous solution at about 70° to 100°C. a chromium (III) salt as described above with fumaric acid or a salt thereof as described above, at a pH of from about 1.5 to 2.4. Alternatively, Type II may be prepared by heating an aqueous solution of Type I under similar pH conditions. In either case, the time of heating should be such that the resulting solution will show the absorption spectrum which is characteristic of aqueous solutions of Type II.

Still another embodiment of the invention is a method for treating a base metal, a metal oxide or a glass substrate to which a coating of an organic polymer is to be subsequently applied to improve the adhesive bonding of the polymer to the substrate, which method involves contacting the substrate with an aqueous solution of a composition of one or more water soluble chromium (III) coordination complexes of (a) chromium (III) derived from a water-soluble salt thereof with a noncoordinated anion, which salt yields hexaaquochromic ion in water, with (b) any above-mentioned trans-acid. Thereafter, the substrate which has been wet with said solution is dried. A preferred method involves contacting the substrate with an aqueous solution of Type I at a temperature at which the solution is liquid, then drying the treated substrate; or, when the substrate is a base metal or a metal oxide, which method involves contacting the substrate with an aqueous solution of Type II at a temperature at which the solution is liquid, rinsing the treated substrate to remove therefrom all soluble residues of the treating solution, then drying the substrate.

A further embodiment of the invention is a method for preparing a composite article comprising a base metal, metal oxide or glass substrate having a coating of an organic polymer composition adhesively bonded thereto through a thin layer of a water soluble chromium (III) coordination complex of (a) chromium (III) derived from a water-soluble salt thereof with a non-coordinated anion, which salt yields the hexaaquochromic ion in water, with (b) a trans-acid such as described above. Thereafter, the substrate is dried and a coating of the organic polymer composition is applied thereto. In a preferred method for preparing a composite article comprising a base metal, metal oxide or glass substrate, the article has a coating of the above Type I or Type II, which method involves, when the substrate is a base metal, a metal oxide or glass, treating the substrate by contacting it with an aqueous solution of Type I, then drying the substrate and applying thereto a coating of the organic polymer composition; or, when the substrate is a base metal or a metal oxide, treating the substrate by contacting it with an aqueous solution of Type II, rinsing the treated substrate to remove therefrom all soluble residues of the treating solution, then drying the substrate and applying thereto a coating of the organic polymer composition.

A still further embodiment of the invention is a composite article comprising a substrate having a coating of an organic polymer composition adhesively bonded thereto; which bonding is through a thin layer of the $Cr^{+3}$ /trans-acid complex on the substrate. When the surface treatment is I, a layer thereof is on substrates such as a base metal, a metal oxide or glass. Bonding may be through a thin layer of Type II adsorbed on substrates such as a base metal or a metal oxide. By composite article is meant an article in which the respective layers adhere to one another; any article in which the layers are not adherent to one another is not an article of this invention.

This invention also relates to compositions comprising coordination compounds selected from the class consisting of fumarato chromium (III) nitrate, aconitato chromium (III) nitrate and mesaconato chromium (III) nitrate.

DETAILED DESCRIPTION AND PREFERRED EMBODIMENTS

Compositions of the present invention comprise one or more water soluble coordination complexes of chromium (III) derived from a water-soluble salt thereof with a non-coordinated anion (which salt yields the hexaaquochromic ion in water) with a trans-acid of the formula It is essential that the geometry of the acid substituents be trans. $R_1$ and $R_2$ may be the same or different. However, they are selected from among hydrogen, alkyl, phenyl, or substituted alkyl or phenyl, e.g., —CH$_2$COOH. The total number of carbon atoms in these trans-acids is an integer in the range 4–10, inclusive. Such acids may be described as trans-1,2-ethylene dicarboxylic acids having 4–10 carbon atoms.

When complexes of $Cr^{+3}$ and trans-acids (such as fumaric acid) are referred to herein, it is not implied that in the complex the acid itself is complexed with $Cr^{+3}$; of course, anions of the acid participate in the complex. In the case of fumaric acid, the anions are the hydrogen fumarate anion, $(H_3C_4O_4)^-$, and the fumarate anion, $(H_2C_4O_4)^=$. Such anions can be supplied to the reaction mixture as the acid, or salts containing either of the anions.

Types I and II

Preferred chromium (III) fumarate coordination complexes of this invention may be represented by the following approximate formulas:

Type I: $[Cr(H_2O)_5(C_4H_3O_4)]_aX_2$

Type II: $[Cr(H_2O)_4(C_4H_2O_4)]_aX$ where X is a noncoordinated anion such as the nitrate or perchlorate anion and a is the valence of X. The term "noncoordinated" means that such an anion is outside the inner coordination sphere of the $Cr^{+3}$ cation. The preferred anion is nitrate. The complexes may be present in aqueous solution in either nonpolymerized form or in varying degrees of polymerization. Although the complexes are water soluble and can remain stable in aqueous solution, their water solubility is not fully similar in character to that of such water-soluble materials as common salt and sugar, which can be completely dehydrated from aqueous solution and then redissolved in water. In most cases, the complexes of this invention, when removed from solution to a completely dry state, will be observed to have become insoluble in water, it is thought by some form of polymerization. II may be present in water solutions in its dimeric and polymeric forms. In both of the complexes, the combining ratio of chromium:fumarate is approximately 1:1 and the chief difference chemically between them appears to be that in I only one carboxyl group of fumaric acid is in inner coordination with the $Cr^{+3}$ cation, while in II both carboxyl groups appear to be in inner coordination with a $Cr^{+3}$ cation, although not necessarily with the same $Cr^{+3}$ cation. Proof of the compositions and structures of these complexes is extraordinarily difficult, in view of which the above formulas should be regarded as approximate. Thus, it may be that the ratio of acid to $Cr^{+3}$ may be somewhat greater or less than one in complexes according to this invention. However, I and II, whether made by the methods described below or by other methods, possess certain unique physical and chemical properties, to be pointed out below, by which they may be identified and characterized. It should be noted that the two complexes as represented in the above approximate formulas can be converted into various acid and base forms by the appropriate addition of acids or bases without losing their characteristic properties and utility.

The over-all reactions by which the subject complexes are formed can be regarded broadly as reactions involving the displacement of other species, usually water molecules coordinated to the $Cr^{+3}$ cation, by one or both carboxyl groups of fumaric acid, such as:

(1)

I or (2)

I and (3)

II or (4) $[Cr(H_2O)_6](NO_3)_3 + C_4H_2O_4Na_2 \rightarrow$
$[Cr(H_2O)_4(C_4H_2O_4)]NO_3 + 2NaNO_3$

II

However, none of the above overall reactions will serve well directly as a way to prepare either of the complexes, except possibly in some instances to prepare them in small albeit sometimes useful concentrations.

Reactions (1) and (3) above are reversible and result in the formation of only minor quantities of the desired complexes because the by-product nitric acid tends to drive the reactions backward. On the other hand, if the reactants indicated for reactions (2) and (4) are simply mixed directly in the indicated proportions, the desired complexes are not obtained. For example, if one formula weight of chromium (III) nitrate in aqueous solution is mixed directly with one formula weight of disodium fumarate in solution, there results a blue precipitate of an insoluble compound of no known utility. In contrast, if the same chemicals are reacted indirectly under the conditions indicated below, a clear green solution of II results, which solution possesses great utility in treating substrates to promote the adhesion of organic polymer coatings thereto.

The general way of preparing Types I and II complexes lies in starting reactions (1) and (3) by holding the reactants together in a water solution for a period of time at elevated temperature; then cooling the solution and either neutralizing or removing some of the nitric acid by-product formed; then raising the temperature of the solution to drive the reaction further towards completion; and repeating these steps until the reaction has been driven to completion or to the desired degree of completion. Thus, the desired reactions are driven forward stepwise in more than one heating step, with neutralization or removal of part of the by-product nitric acid between succeeding reaction steps. During the various steps, it is necessary to control the pH of reaction solution to within certain approximate limits. If these limits are exceeded, then I may change at least partially to II, which partial change is usually not advantageous; and II may be totally converted to an insoluble green precipitate or gel of no known utility.

In preparing I, the pH (measured at 25°C.) of the reaction solution, after the initial high temperature partial reaction of the hexaaquochromium (III) salt with fumaric acid, should not be allowed to exceed about 1 until all succeeding high temperature reaction stages are completed. Generally, the pH should be maintained at about 0.2 to 1. On the other hand, in preparing II, the pH (also measured at 25°C.), after the initial high temperature partial reaction, should be above pH 1 but should not exceed about 2.4 until all succeeding high temperature reaction stages are completed. Preferably, the pH will be in the range 1.5 to 2.2. However, II can also be made by the very slow addition of a dilute solution of chromium (III) nitrate to a boiling solution of fumaric acid-sodium fumarate at a pH in the range 3.0 to 4.5, but this method is not preferred. In no case should the reaction solution be subjected to elevated temperatures when at a pH in the vicinity of pH 2.7, otherwise conversion of the chromium salt to an insoluble useless product results. After all high temperature reaction stages have been completed, the pH restrictions indicated no longer apply and the resulting solutions of the complexes may be stored or used at other degrees of acidity.

In the preparations indicated above, advantage is taken of the discovery that the reactions leading to either the desired or other coordination interchanges are very slow at low temperatures while the ordinary acid-base reactions are still very fast at such temperatures. The course of the coordination reactions involved in the preparations can be followed by color changes. Thus, the color of the starting hexaaquochromium ion is purple blue, and although I is visually little different in color therefrom its light absorption spectrum is characteristically different. On the other hand, solutions of II have a clear medium green color and give a light absorption spectrum, both of which are characteristic. Solutions of mixtures of I and II, which generally are less desirable than solutions of either alone, have colors ranging from a dirty blue to various shades of blue-green. Any appearance of haze, turbidity, precipitate or gel in the solutions of these products will generally indicate a preparative error which usually leads to complete precipitation and total loss of utility.

In the preparation of Types I and II complexes, the number of heating and cooling (with neutralization) stages is not critical providing the above pH limitations are observed and the reactions are driven forward to achieve the conversion to the desired complex, which can be verified by light absorption spectra.

Solutions can be prepared containing I at concentration equivalent up to 0.1 to 0.5 gram atom of chromium/liter, or more; most generally the concentration will range from the equivalent of about 0.05 to 0.5 gram atom of chromium/liter. After the preparation is complete and no further heating steps are to be made, the product solution will have a useful life at any pH within the range of about 0.2 to about 4.5, where precipitation occurs. Maximum stability occurs at a pH above 1, e.g., in the range of about 2 to 4, since at a pH of 1 or lower, a slow reversion even at room temperature occurs because of reaction of the complex with by-product nitric acid with reformation of the hexaaquochromic ion and fumaric acid. Such reversion is greatly minimized by raising the pH to 2–4 before storage. Such alteration of the pH following the preparation is, of course, not essential if the solution is to be used immediately. However, even under the above pH conditions preferred for storage, the solutions if stored at temperatures above about 35°C. will tend to convert either partly or completely to solutions of II. Thus, if such conversion is undesired, solutions of I should generally be stored at a temperature below about 35°C. and at a pH of 0.2 to 4, preferably 2 to 4. Solutions of I can be concentrated, e.g., by evaporation, under such temperature and pH conditions.

Solutions of II will generally be made at concentrations equivalent to not more than about 0.1 gram atom of chromium/liter, the preferred concentrations ranging from the equivalent of about 0.01 to 0.05 gram atom chromium/liter. At higher concentrations, the complex appears to be unstable and forms a green scum or a generally useless green precipitate or gel.

After preparation, solutions of II can be stored indefinitely at any temperature at which they remain liquid and at the pH left by the synthesis or at any pH in the range from about 0.8 to about 2.4 or in the range of about 3.0 to 5.5. However, at pH values between about 2.4 and 3.0, and particularly at pH 2.7 and in the vicinity thereof, the complex tends to precipitate completely from solution as a green precipitate, which usually forms immediately but sometimes on standing. Such a precipitate can be redissolved if the pH is immediately lowered to 2.4 or below or raised to about 3.5 or above; however, if permitted to age, the precipitate cannot be redissolved in this manner.

The acid-base reactions of II indicate that the complex can exist as a soluble cation which is acidic, or as a less acidic species which is uncharged and insoluble, or as a still less acidic species which is anionic. It is thought that these species form from reactions resulting in the successive removal of hydrogen ions from the coordinated water molecules, as for example:

$$[Cr(H_2O)_4(C_4H_2O_4)]^{+1} +$$
$$OH^- \rightarrow [Cr(H_2O)_3(OH)(C_4H_2O_4)]^0 + H_2O \downarrow + OH^-$$
$$[Cr(H_2O)_2(OH)_2(C_4H_2O_4)]^{-1} + H_2O$$

Although the soluble acidic and basic forms are stable in the pH ranges mentioned above, their degree of long-term stability may be less the closer the pH approaches 2.7. At solution pH values above about 5.5., the complex appears slowly to become insoluble again, possibly with some decomposition.

In carrying out preparations of the present complexes as generally indicated above, the reactions to produce the complexes become progressively slower the lower the reaction temperature. Accordingly, it is preferred that the heat reaction stages be carried out at about the normal boiling temperature of the reaction solution, e.g, at 70 to about 100°C. Higher temperatures can be used at pressures above normal. Lower temperatures can also be used but require longer times and at temperatures below about 70°C. the reactions are generally too slow for such temperatures to be practical. The time of reaction, i.e., the total time at the elevated temperature should, of course, be sufficient to effect the desired conversion to the complex. Thus, some useful conversion generally will result in 5 minutes at 100°C. and during somewhat longer times at lower temperatures. Complete conversion of the chromium (III) raw material to the desired complex will generally require a minimum total time of about 40 minutes at 100°C., but somewhat longer total times of from 2 to 4 hours, will usually be used to assure completion of the conversion. Still longer times, e.g., in excess of 6 hours, can be used but generally are not required.

The by-product acid neutralization reaction stages intermediate to the high temperature reaction stages should generally be carried out at relatively low temperatures, e.g., temperatures not higher than about 35°C. in order to avoid undesired coordination reaction which may lead to precipitation of inactive materials. Temperatures at about room temperature, e.g., 20° to 30°C., are highly satisfactory and preferred.

Chromium (III) compounds which yield the hexaaquochromic ion in aqueous solution can be used as the chromium (III) raw material in preparing the present complexes. Chromium (III) nitrate, $Cr(NO_3)_3 \cdot nH_2O$ where $n$ may be 6 to 9, is the preferred salt. Another such salt is chromium (III) perchlorate, but its use is not preferred for reasons of safety. In most other chromium (III) salts, one or more of the six coordination positions may be coordinated with one or more anions instead of water. Some of these can be used. Thus, the desired complexes have been made from chromium (III) acetate and formate with enough added nitric acid or sulfamic acid to establish pH below, for example, 2.4 in the case of II. However, use of the acetate or formate salt is not preferred since, although the fumarate anion can replace the acetate and the formate anions from inner coordination, the reactions using these salts are much more sensitive to aberrance from precise reaction conditions and insoluble and inactive products frequently result from even slight changes in preparative conditions.

The reactions to produce the present complexes are best carried out using fumaric acid, $C_4H_4O_4$, itself, although the soluble hydrogen fumarates, such as the alkali metal or ammonium hydrogen fumarates, e.g., $NaH(C_4H_2O_4)$, and the soluble fumarates such as the dialkali metal or ammonium fumarates, e.g., $Na_2(C_4H_2O_4)$, may be used in adjusting the pH. The chromium (III) salt and the fumaric acid reactants can be employed in any desired proportion, however, it is generally preferred that a stoichiometric excess of fumaric acid be used in order to further the conversion of the chromium (III) reactant to the desired complex. Thus, a large excess of fumaric acid, e.g., up to its solubility limit of about 10% by weight at 100°C., is preferred. After completion of the reaction, the unreacted excess fumaric acid can be readily recovered since it is only sparingly soluble in cold solutions at the pH conditions used. If less than one formula weight of fumaric acid is used per formula weight of the chromium (III) reactant salt used, conversion to the desired Type I or II complex will occur, but obviously complete conversion of the chromium (III) reactant to 1:1 chromium to fumarate complex will be impossible because of the fumaric acid deficiency.

Strangely, the cis-isomer of fumaric acid, i.e., maleic acid, is not effective for the present purpose and may not be substituted for fumaric acid. However, if desired, a substituted fumaric acid such as methylfumaric acid (mesaconic acid), phenylfumaric acid, etc., may be used in place of fumaric acid, provided that the substituent or substituents replace(s) one or both of the hydrogen atoms directly attached to carbon atoms of the fumaric acid structure, and also provided that the trans-configuration is maintained. Fumaric acid may be termed "trans-1,2-ethylene dicarboxylic acid,"

wherein 1- and 2-positions each have one hydrogen substituent. Each of these hydrogen substituents may be replaced by methyl, ethyl, phenyl, —$CH_2COOH$, etc., to form substituted fumaric acids, including monosubstitution (at the 1-position) and disubstitution (at the 1- and 2-positions). Substituted fumaric acids containing a total of up to 10 carbon atoms may be used in the present invention, specifically the acids represented by the formula wherein $R_1$ and $R_2$ may be the same or different, and may be, e.g., hydrogen, methyl, ethyl, phenyl, —$CH_2COOH$, etc. However, since fumaric acid is nontoxic and most readily available, it is preferred over such substituted acids.

Almost any of the common basic materials may be used to raise the pH of the reaction solutions as required, e.g., at stages between the high temperature reaction stages, or to raise the pH of the product solutions for storage. Examples of such basic materials are the alkali metal and ammonium hydroxides, carbonates, bicarbonates, hydrogen fumarates and fumarates. Their function is to remove or neutralize the by-product hydrogen ion in controlled amount. Controlled removal of such by-product hydrogen ion can also be accomplished by means of a basic ion exchange resin. Use of such a resin may be preferred when it is desired to obtain a product solution that is free of soluble nitrates other than the nitrate salts of the complexes. An example of a basic anion exchange resin suitable for the above purpose is the hydroxide or carbonate form of the commercially available Amberlite IRA-400, which is a resin of the type described in McBurney U.S. Pat. No. 2,591,573 in which nitrogen atoms of the functional quaternary ammonium groups are attached through saturated hydrocarbon groups, e.g., the methylene group, to the aromatic nucleus of a cross-linked copolymer of styrene and divinyl benzene.

Although the use of a base or a basic ion exchange resin is usually needed as indicated above to prepare these complexes in a suitable degree of conversion from the starting hexaaquochromium salt, this is not always so since in some cases the solvent water may also act as a base, i.e., to remove hydrogen ions, by the reaction $H^+ + H_2O \rightarrow H_3O^+$. Thus, reaction (1) may proceed far enough to form a useful concentration of I even though no base be added and even though the solution still contains a relatively large proportion of chromium as unconverted hexaaquochromic ion. The resulting product solution promotes adhesion of organic polymers to glass or metal, though not as well as solutions in which a greater degree of conversion to the complex has been secured by use of a basic material.

Figure 1:
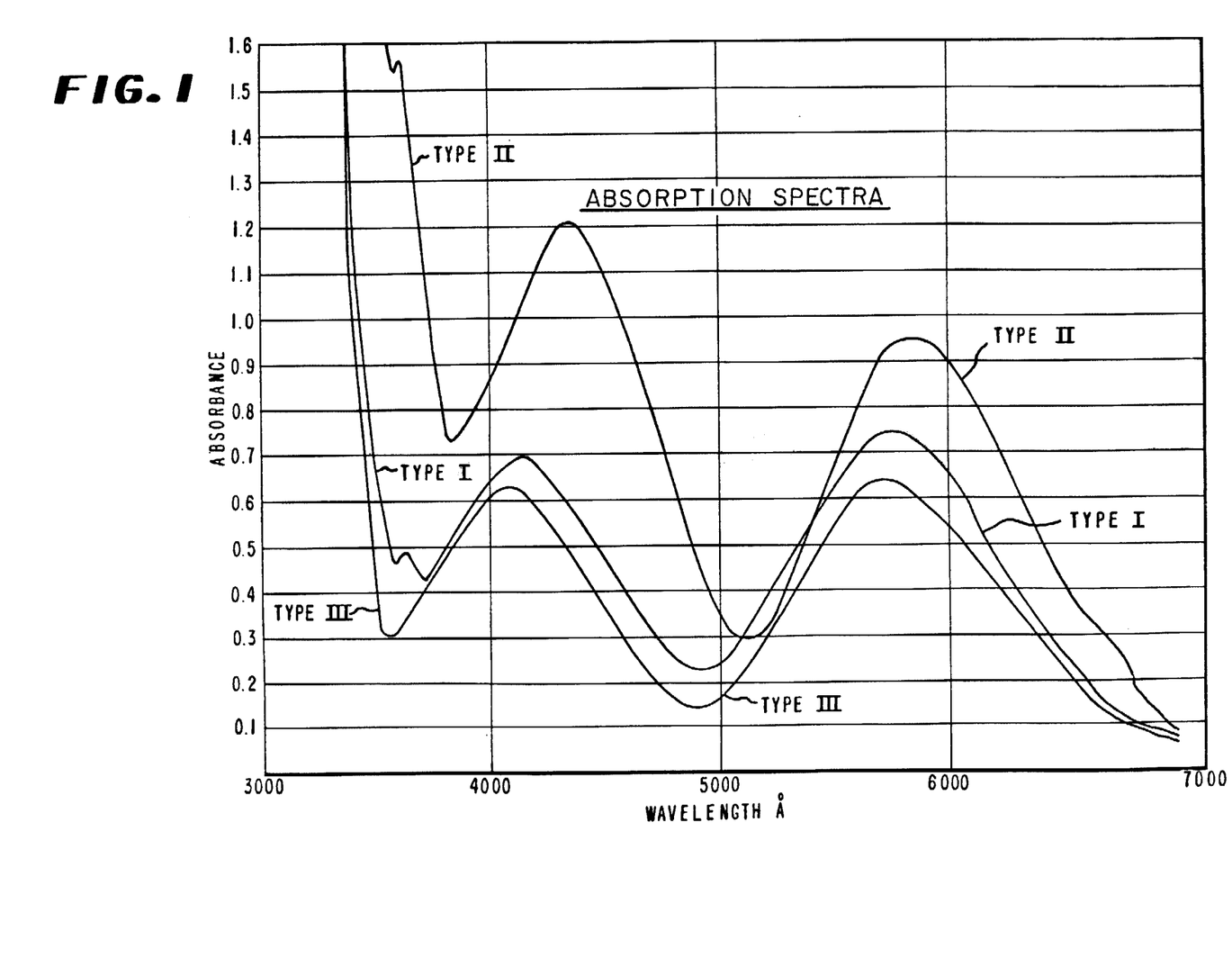
FIG. 1 is a graph showing the broad band light absorption spectra for solutions of Type I, Type II and Type III.

The light absorption of aqueous solutions of I and II (measured within one week of preparation of the complexes) are broad band spectra in the range of 3000–7500A, as shown in the drawing which includes curves representing the spectra for aqueous solutions of I and II and also a curve for the spectrum of a solution of Type III complex discussed below. Characteristic features of the spectra for solutions of I and II are tabulated below along with the corresponding features for a solution of chromium (III) nitrate.

It will be appreciated that the position of the spectral maxima may shift slightly depending upon minor variations in the procedure of complex preparation and upon the presence of any minor impurities. Generally, the peak positions in carefully prepared fresh samples will vary not more than ±30A, and the molar absorbances will vary by not more than ±2. The values for molar absorbance will increase as the solutions age, the amount of increase depending on pH, temperature, etc.

The shoulder shown at 3610A in the Type I spectrum may be due to the presence of minor impurities. Type I has a characteristic two-maxima spectrum.

TABLE I

ABSORPTION SPECTRA FOR SOLUTIONS CONTAINING 0.025 g. ATOM $Cr^{3+}$/LITER: WAVELENGTH ($\gamma$) IN ANGSTROMS AND MOLAR ABSORBANCE ($A_m$)

| | Max 1 | | Max 2 | | Max 3 | |
|---|---|---|---|---|---|---|
| | $\gamma$ | $A_m$ | $\gamma$ | $A_m$ | $\gamma$ | $A_m$ |
| $Cr(NO_3)_3 \cdot 9H_2O$ | 5730 | 12.4 | 4090 | 15.3 | — | — |
| Type I | 5750 | 31.1 | 4120 | 29.8 | — | — |
| Type II | 5850 | 37.8 | 4300 | 49.5 | 3620 | 62.0 |

In addition to the characteristic features set forth in Table I, it was found that light was highly absorbed or virtually completely cut off from 3200A down to below 2600A by solutions of I, and from 3470A down to below 2600A by the solutions of II, while solutions of sodium fumarate or fumaric acid showed a cut-off from 2990A.

Solutions of both I and II are highly useful in treating substrates to improve the bonding of organic polymers thereto, but their modes of use and specific applications differ somewhat. Solutions of I are most useful in applications to nonmetal substrates such as glass, although they can also be usefully applied to base metal and metal oxide substrates. In their applications, the substrate is best primed with the treating solution, i.e., the substrate is wet with the solution which is allowed to dry thereon without rinsing so as to leave a thin film of the dried material on the substrate. In contrast, solutions of II have little utility for treating ordinary (i.e., soda lime) glass substrates, but are outstandingly useful in treating base metal and metal oxide substrates. After contacting such a substrate with the solution of II, the substrate should be rinsed so as to remove therefrom all soluble residues of the solution. The effect of the treatment is to cause an invisible, nonetching surface alteration, probably the adsorption of a monomolecular layer of the compound, which is remarkable in improving the speed and durability of adhesion of polymers to the substrate. Experiments with high surface area powders such as alumina and titania have shown that these can absorb irreversibly the chromium compounds from II solutions, so that the chromium compounds are not removed by subsequent washing.

It has subsequently been found that solutions of II can be similarly outstandingly useful in treating base metal and metal oxide substrates, without the rinsing step mentioned in the previous paragraph. Thus, aqueous solutions containing low concentrations of II can be applied and dried without rinsing, provided the pH of such solutions is controlled to prevent precipitation of II. Although this low-concentration method of application has the advantage of conserving quantities of complex which would otherwise be lost by rinsing, and, of course, eliminates the need for the rinsing step, it has been found that careful control of the uniformity of both complex concentration and the amount of solution applied is necessary. If either too little or too much complex is applied without rinsing, per unit area of substrate, resulting adhesion will be inferior. It is generally preferred to use more concentrated complex solutions and rinse, as described above, to provide the most dependable adhesion of polymer to any shape of object, whether curved, corrugated, hollow, flat, polished, smooth or rough, over the entire surface including edges and corners.

Effective treatment of substrates with solutions of I may be done using solutions having a pH of 0.2 to 4, preferably 3 to 3.5, and a concentration of I equivalent to from about 0.0005 to 0.5, preferably 0.001 to 0.005, gram atom of chromium per liter. Contact of the substrate may be effected simply by immersing the substrate in the solution, followed by draining the excess, or the solution may be sprayed or wiped on the substrate. Although the treating solution may be used at any temperature at which it is liquid, temperatures not higher than about 35°C. are preferred, since at higher temperatures slow conversion to II may result. Mere contact of the substrate with the solution is all that is required, although long contact times are not harmful. The solution wetting the substrate after draining off the excess is preferably dried on the substrate before applying the organic polymer, so as to leave thereon a thin film of dry residues from the solution. For economy reasons, it is preferred to set the conditions of solution concentration and amount of solution applied so that there is a barely visible iridescence left after drying with the thickness of the residue on the substrate being of the order of from about one-fourth to several times the wavelength of visible light, e.g., 0.1 to 2 microns.

Effective treatments of substrates with solutions of II may be done with solutions having a pH of above 1 to 2.4 or 3.0 to 5.5, preferably pH 2.1 to 2.3 or 4.0 to 4.7. pH values in the lower range may be obtained by adjustment with any desired water soluble basic material such as the alkali metal hydroxides, carbonates and bicarbonates; pH values in the upper range are preferably attained by means of a fumarate buffer such as a solution containing fumaric acid and a soluble fumarate such as sodium fumarate. The concentration of II in the treating solution generally will be equivalent to from 0.0001 to 0.1, preferably 0.001 to 0.025, gram atom of chromium per liter. The contacting of the solution with the substrate can be effected as described above for solutions of I; however, following the contacting, the substrate should be rinsed to remove therefrom any soluble residues of the treating solution. The time of contact of the substrate with the solution is dependent somewhat upon the concentration of the solution and the temperature. With the most dilute solutions, a temperature of 90°-100°C. for at least 5 minutes is desirable, although some useful effect is obtained even at room temperature. With the more concentrated of the solutions, excellent treatment at room temperature or lower may be practically instantaneous, but longer contact with the solution is not harmful.

Worthwhile treatment of the substrate prior to application thereto of the organic polymer can be attained using a solution containing both fumaric acid (or a substituted fumaric acid having up to and including 10 carbon atoms) and a water soluble chromium (III) compound, e.g., chromium nitrate or perchlorate, which yields the hexaaguochromic ion in solution, without any separate preparative step to convert the solutes to either I or II. Thus, if a metal substrate is treated for several minutes at a temperature of 90°-100°C. with a solution of chromium (III) nitrate and fumaric acid at a pH of 1.8 to 2.4, a useful improvement in polymer adhesion results. This is not surprising since the treatment conditions indicated approximate those for the formation of II.

In treating substrates with any of the above-described treating solutions, particularly when the substrate is one such as mild steel which tends to be corroded by mildly acidic solutions, it may be desired to add to the solution a corrosion inhibiting agent such as a soluble hexavalent chromium compound, e.g., sodium chromate. The addition of a hexavalent chromium compound at a concentration equivalent to from about 0.001 to 0.1 gram atom of chromium per liter is effective for this purpose.

The substrates which may be effectively treated with one or the other of the treating solutions described above include any of the common base metals or alloys thereof normally used for structural purposes. Such metals are those which are no higher than magnesium in the electromotive series, such as aluminum, iron, steel, stainless steel, copper, brass, titanium, magnesium, nickel, tin, tin plate, zinc and zinc plate. Also included are metal oxide substrates such as aluminum oxide ceramic and titanium oxide materials, and glass. The substrate may be in any desired physical form, e.g., in the form of foils, sheets, rods and the like, or in particulate, wire or fibrous forms commonly employed for reinforcing plastic objects. In all cases it is preferred that the substrate be clean prior to treatment, that is, free of oily and greasy contaminants and the like.

Treatment of such substrates with the treating solutions described is generally effective to give at least some worthwhile improvement in the adhesive bonding to the substrate of any subsequently applied organic polymer which is solid in its finally applied form and which can be applied to the treated substrate in a nonaqueous form which will wet the substrate, e.g., in molten form, in solution in a volatile organic solvent, or in plastic form. Preferably, the organic polymer that is applied to the treated substrate will have dispersed therein from 0.4 to 10%, preferably 1 to about 6%, by weight of a finely divided alumina which has a combined water content no greater than 9% and a specific surface area, as measured by the nitrogen adsorption B.E.T. method described by Nelson and Eggertsen in Analytical Chemistry, Vol. 30, pages 1387-1390 (1958), of at least 5, preferably 15 to 700, square meters per gram. Among the various organic polymers, preferably with such alumina dispersed therein, that may be advantageously applied to the treated substrate in accordance with the invention, those that are preferred include the meltable or thermoplastic polymers such as the olefin hydrocarbon polymers particularly the low and high density polyethylenes, polypropylene, ethylene/vinyl acetate copolymers, polyvinylidene fluoride, vinyl chloride/vinyl acetate copolymers, polycarbonates such as bisphenol A polycarbonate (the polycarbonate of 4,4'-isopropylidene diphenol), polysulfones such as the polysulfone made by reacting the disodium salt of 4,4'-isopropylidene diphenol with 4,4'-dichlorodiphenyl sulfone, polyamides, polyesters, polyurethane, polyvinylbutyral and butadiene/styrene copolymers. Useful polyethylenes include linear high-density polyethylene made by high pressure coordination catalysis reaction and linear low-density polyethylene made by coordination catalysis at low pressure with butene-1 comonomer. If the polymer is to have a high surface alumina, i.e., one having a specific surface area of at least 5 square meters per gram, dispersed therein, it should, of course, be one which is stable in the presence of such alumina. Such polymer/high surface alumina compositions are disclosed and claimed in my copending application Ser. No. 25,234 filed Apr. 2, 1970, now abandoned.

The use of any of the substrate pretreatments described above will usually greatly accelerate the development of adhesion of a subsequently applied organic polymer and also enhance durability of such adhesion. To obtain the greatest degree of durability of adhesion in the continuing presence of both stress and moisture, it is preferred that the polymer that is applied to the treated substrate be one that has dispersed therein a high surface alumina as mentioned above.

When glass is treated with Type I and dried prior to lamination to polyvinylbutyral resin, adhesion is generally increased. The relative improvement in adhesion obtained with the treated glass compared to the untreated glass increases as the moisture content of the polyvinylbutyral resin increases. Thus, this treatment of the glass results in a bond which is much less sensitive to moisture. This property is important in many applications where the exposure of the resin-glass bond to high humidity conditions could result in a failure of the bond. Such applications are to be found in automotive uses such as adhesively mounted rear view mirror knobs, laminated windshield constructions subject to edge delamination under humid conditions, laminated glass structures comprising metallized glass or metallized resin for certain architectural applications, edge sealing systems for architectural glazing and the like.

Type III

The discussion above for Type I and II complexes, relating to theory, bonding, etc., generally relates to Type III including possible higher molecular weight species.

It will be evident that some characteristics of Types I and III are similar, such as light absorption maxima frequencies and effect on adhesion, although other properties such as spectral absorbance and stability on aging in solution differ somewhat. Thus, it appears that the gross stoichiometric ratio, in solution, of chromium atoms to fumarate molecules among Types I, II and III may vary over the range of about 1/0.4 to 1/1.2. The exact nature of the species or mixtures of species in solution is not known, but these soluble fumarate coordination complexes or mixtures thereof are all of outstanding utility in promoting adhesion. Some free chromium nitrate and/or fumaric acid may also be present in these solutions without material adverse effect.

In preparation of Type III compositions the nitrate anion is generally preferred. The fumaric acid to chromium molar ratio of about 0.5 in Type III is preferred in some cases where highly concentrated solutions are to be stored or shipped, because at this ratio such solutions are of outstanding stability. Complexes or mixtures containing a substantially lower ratio of trans-acid to chromium can be prepared but offer no particular advantage in stability and tend to be somewhat less effective for bonding polymers, such as polyethylene to substrates such as glass. In general, for Type III preparations the range of 0.4 to 0.6 mole of fumaric acid per gram atom of chromium is preferred.

Particularly preferred Type III compositions are aqueous solutions containing about 1.5 gram atom of chromium per liter of solution, with about 1.2 equivalents of base (preferably alkali) and about 0.5 mole of fumaric acid per gram atom of chromium. These solutions are preferred because they have a high chromium concentration, because they are stable for extended periods at temperatures up to 45°C., and because they are highly effective for bonding polymers such as polyethylene to glass substrates. These high chromium concentrations are obtainable only by carefully controlling the fumaric acid to chromium ratio and the alkali to chromium ratio. These compositions will contain 1.0 to 1.5 equivalents of base and 0.4 to 0.6 mole fumaric acid per gram atom of chromium. Preferred compositions will contain 1.15 to 1.25 equivalents of alkali per gram-atom of chromium. Compositions containing over 2 gram atoms of chromium per liter can be prepared, but they are not as stable and therefore not as preferred. The preferred chromium concentration range is 1.25 to 1.75 gram atoms per liter. Lower concentrations may be prepared but are more expensive to ship and store.

The preparation of Type III complexes, having a fumaric acid to chromium nitrate molar ratio of approximately 0.5, is described in copending commonly assigned application Ser. No. 211,104 of Harry B. West, filed on the same day as the parent of this application now U.S. Pat. No. 3,725,448.

The process comprises heating at 50°C. to reflux an aqueous solution of chromium (III) nitrate, the trans-acid to be used (such as fumaric acid) and a base (preferably an alkali, e.g., a hydroxide, carbonate of bicarbonate of an alkali metal or alkaline earth metal) for sufficient time to substantially drive the reaction to completion. The reaction time is about 10 minutes to one hour. The proportions of starting materials are 1.0-1.5.g/equivalent of a base and 0.4-0.6 mole of trans-acid per mole of Cr (III) nitrate. The resulting solution has 1-7 weight percent chromium.

Such compositions, containing about 1.5 gram atoms of chromium per liter of solution and about 1.2 equivalents of alkali and 0.5 mole of fumaric acid per gram atom of chromium, are further characterized in having the following light absorption maxima and molar absorbance for freshly prepared solutions.

| $\gamma$ | $A_m$ |
|---|---|
| 4100–4120A | 25–26 |
| 5700–5750A | 25.5–26.5 |

Minor variations in the preparative procedure or the presence of impurities may change these values slightly. The molar absorbance will generally increase as the sample ages.

Type III has been found to be useful in promoting the adhesion of polymers to metal and glass surfaces.

The invention is illustrated by the following examples in which all amounts, proportions and compositions expressed as percentages are by weight.

EXAMPLE 1

Degreased polished 5-mil aluminum foils were used. One pair (a) was untreated. One pair (b) was treated in an aqueous solution of 50 g./liter furmaric acid, $C_4H_4O_4$, at 90°–100°C. for 5 minutes, then thoroughly rinsed and dried. A third pair (c) was immersed for 5 minutes at 90°–100°C. in a water solution of 1 g./liter of chromium (III) nitrate, $Cr(NO_3)_3 \cdot 9H_2O$, containing also 50 g./liter of fumaric acid, then thoroughly rinsed and dried. These pairs of foils, of which only (c) represents a practice of this invention, were ach sandwiched together with an adhesive consisting of pure high density linear polyethylene made by a high pressure reaction using a coordination catalyst (melt index 3.0) containing dispersed therein 5% of fine particles of an alumina prepared by calcining an alumina hydrate at 450°C. for 2 hours. The alumina has a specific surface area of 700 sq. meters per gram and a combined water content of less than 4%. The sandwiched assemblies were pressed to an adhesive layer thickness of 5 mils in a press at 170°C. for 5 minutes. The assemblies were cooled in water, then cut into strips, and peel strengths (the peeling force in pounds divided by the strip width in inches) were measured by pulling apart in conventional T-peel configuration at a rate of 1 inch per minute, with the following results:

| Substrate | Peel Strength, lb./in. |
|---|---|
| (a) Untreated | <0.1 |
| (b) Treated with fumaric acid | 0.2 |
| (c) Treated with chromium (III) salt + fumaric acid | 35 |

These results illustrate the superior degree of development of adhesion within the specific time-temperature conditions of application when the substrate is pretreated with the chromium salt and fumaric acid, even though they have not been intentionally precombined to form any coordination complex. They disclose nothing, however, about the durability of bond strength.

EXAMPLE 2

A solution containing principally the Type I coordination compound of the invention was prepared by heating for 1 hour at 100°C. 250 ml. of an aqueous solution containing 20.0 g. of chromium (III) nitrate, $Cr(NO_3)_3 \cdot 9H_2O$, and 25 g. fumaric acid. The solution was then cooled to 5°–6°C. and filtered to remove the excess fumaric acid which crystallized out. The dark blue filtrate was found to be at pH 0.58. The solution was diluted with seven times its volume of water, attaining by this dilution a pH of 1.69. It was then adjusted by the addition of sodium bicarbonate to pH 3.20. Although only part of the hexaquochromium in the reaction solution was converted to I, the resulting solution was effective for treating metal, metal oxide and glass substrates to improve the adhesion thereto of subsequently applied organic polymer coatings.

EXAMPLE 3

A solution of I was prepared as follows In a total volume of 210 ml. an aqueous solution was made of 40.0 g. chromium (III) nitrate, $Cr(NO_3)_3 \cdot 9H_2O$, and 23.20 g. fumaric acid. The solution, initially at pH 2.3, was held 20 minutes at 100°C., then cooled to 24°C. The pH, resulting from the initial reaction, was 0.29. To this was added with stirring 22.0 ml. of a 0.998 normal solution of ammonium bicarbonate, $NH_4HCO_3$, raising the pH to 0.37. The solution was held at 100°C. again for 30 minutes, then cooled to 24°C., resulting in a pH of 0.29. To this was added 18.0 ml. of the 0.993 normal ammonium bicarbonate solution, raising the pH to 0.38. The solution was held at 100°C. for 30 minutes, then cooled to 24°C. resulting in a pH of 0.37. To the solution was then added 10.0 ml. more of the 0.998 normal ammonium bicarbonate solution, raising the pH to 0.40. The solution was again held at 100°C. for 50 minutes, then cooled to 24°C., resulting in pH of 0.29. This completed the heating phases. To the solution was then added 96.1 ml. of the 0.998 normal ammonium bicarbonate solution, raising the pH to 2.20 in order to stabilize the solution. The solution was chilled to 3°–5°C. and filtered to remove excess fumaric acid. It was diluted with 19 times with its volume of water, then adjusted to pH 3.1 with ammonium bicarbonate solution, being then a deep blue solution giving the absorption spectrum indicated by one of the curves of the drawing. This example illustrates the preparation of a fairly concentrated solution of freely pure I.

EXAMPLE 4

Several soda lime glass rectangles, 2 inches by 3 inches, were half immersed in the solutions of Examples 2 and 3, and then drain and dried without rinsing so as to leave faintly iridescent films over the treated halves. On the glass rectangles were laid strips of the pure high density polyethylene of Example 1, containing dispersed therein 5% of calcined high surface alumina having a specific surface area of 17 sq. meters/gram and a combined water content of less than 4%. This alumina has been prepared by grinding a commercial activated alumina to a fine powder and then calcining it for 2 hours at 1000°C. The polyethylene/alumina strips were 50 mils thick, one quarter inch wide and 2½ inches long. They were laid on the glass in such a way as to overlie both the treated and untreated areas of the glass, baked on at 170°C. for 20 minutes, then cooled. The resulting structures were immersed in water at 25°C. to test for loss in adhesion of the polyethylene to the glass. The polyethylene material detached itself from the untreated areas of glass in a few minutes, but not from the treated areas in 10 days. In some cases of the several test specimens, detachment in the region of the treated area did occur but only by failure within the glass rather than at the adhesion interface between glass and polymer, actually peeling out strips of glass firmly attached to the polymer. These results demonstrate a remarkable improvement resulting from the pretreatment of the glass with the solution of I.

EXAMPLE 5

Aluminum and 316 stainless steel rectangles were treated and tested as was the glass in Example 4 except that the baking temperature and time were 150°C. for 10 minutes. The polyethylene/alumina strips were easily detached without residue from the untreated metal, leaving no residue, but were detached only with difficulty from the treated metal areas with tearing within the polymer resulting and leaving behind thick torn residues of polymer over the entire treated metal areas.

EXAMPLE 6

In this example, a solution of Type II was prepared. The preparation was at a total volume of 1 liter, which was maintained by addition of water to make up for evaporation losses during boiling.

In a liter of total aqueous solution were placed together 20.0 g. chromium (III) nitrate, $Cr(NO_3)_3 \cdot 9H_2O$, and 40.0 g. of fumaric acid. The solution was boiled for 1 hour, then cooled to 24°C., resulting in a clear blue solution with pH 1.18. To this was added with stirring 34.0 ml. of a 1.000 normal sodium bicarbonate solution, resulting in a pH of 1.43. The solution was boiled again 1 hour, then cooled to 24°C., resulting in a pH of 1.33. To this was added 33.0 ml. of the 1.000 normal sodium bicarbonate solution, resulting in a pH of 1.63. The solution was boiled again for 1 hour, then cooled to 24°C., resulting in a pH of 1.44. To this was added 33.0 ml. of the 1.000 normal sodium bicarbonate solution, resulting in a pH of 1.84. The solution was boiled 3 hours longer, resulting in a pH of 1.67. It was then cooled to 4°-5°C. and filtered to remove excess fumaric acid. The resulting solution had a clear medium green color with an absorption spectrum as indicated by one of the curves of the drawing. This example illustrates the preparation of a fairly completely converted solution of II which was essentially pure except for the presence of by-product sodium nitrate.

EXAMPLE 7

In this example, a solution of II was prepared in three heating-cooling-neutralization stages and one final heating-cooling stage, the neutralization being done with the base form of a quaternary ammonium ion exchange resin, Amberlite IRA-400. The commercially available form of this resin was first treated in a column with a large excess of a 2% sodium hydroxide solution, then thoroughly washed with water to remove all soluble materials, thereby producing the base form which was used.

A solution of 20 g. of $Cr(NO_3)_3·9H_2O$ and 40 g. of fumaric acid in 1 liter of water was boiled for 1 hour, then cooled to 24°C. The excess fumaric acid was temporarily removed by filtration, and the pH of the solution was raised to 1.51 by stirring in some of the basic resin. After filtering out the resin, the excess fumaric acid was added back, and the solution was boiled for 1 hour. It was then again cooled to 24°C. and filtered to remove temporarily again the excess fumaric acid. The pH, 1.31, was raised again by the addition of resin to 1.59 in this second stage. In a third similar stage, pH was raised from 1.43 to 1.80. In the final two hour heating-cooling stage, without subsequent neutralization, the pH went finally to 1.61. The solution was then chilled to 3°-5°C. and filtered to remove the excess fumaric acid. The final stock solution was in all respects simlar in color, absorption spectrum and chemical behavior to the product solution of Example 6, except that it did not contain by-product sodium nitrate.

A treating solution was made from the above stock solution by adding sulfuric acid to water to arrive at pH 2.3, then adding 5 ml. per liter of the above stock solution. When degreased aluminum foils were pretreated for 5 minutes at 90°-100°C. with this solution, rinsed, dried, then sandwiched together with the polyethylene/alumina adhesive described in Example 1 and the resulting assemblies tested as in that example, the resulting peel strength found was also 35 lb./in. These results show that solutions of preformed II give about the same end results as do solutions of the raw chromium nitrate-fumaric acid mixture used in Example 1, but at only one-tenth the concentration of chromium.

EXAMPLE 8

One volume of the solution of II of Example 6 was mixed with 9 volumes of a 0.45% water solution of fumaric acid. Five-mil aluminum foils were treated by immersion in this solution having a pH of about 2.3 for 10 minutes at 60°C., then rinsed and dried. Similar foils not so treated were used as controls. Peel test specimens using these foils were made as in Example 1 employing three different types of organic polymer adhesives, which did not contain dispersed alumina, in contrast of Example 1. These polymers were the high density polyethylene of Example 1; an ethylene/vinyl acetate copolymer containing 18% vinyl acetate; and a polyamide which was a copolymer of caprolactam, hexamethylene adipamide and hexamethylene sebacamide. The conditions of making and testing the specimens were the same as in Example 1, except for application temperatures which are indicated below.

| Adhesive | 5-Minute Application Temperature | Peel Strength Untreated Metal | lb./in. Treated Metal |
|---|---|---|---|
| Polyethylene | 170°C. | <0.2 | 35 |
| Ethylene/vinyl acetate copolymer | 185°C. | 6.5 | 35 |
| Polyamide | 185°C. | 12 | 37 |

This example ilustrates the superior degree of development of adhesion within the specified time-temperature conditions of application. It shows nothing, however, about the durability of bond. It also shows the use of II in solution at a relatively low pH, in contrast to the less acidic solutions used in Examples 11 and 12.

EXAMPLE 9

The solution of II of Example 6 was diluted with an equal volume of water and then adjusted with addition of sodium bicarbonate to be at pH 2.20. This solution was used for treating clean metal parts of test units by immersing them in the solution at room temperature (24°C.) for 5 minutes, and then rinsing and drying. Butt tensile test units were prepared with clean polished mild steel, aluminum, copper, and titanium metal parts treated in this way. The test units were designed so that the cross-sectional areas of the test unit joints were identical, being 2 inches long in total and 0.021 inch wide, so chosen to accelerate the damage by diffusion of water in subsequent testing. The adhesive joint thickness was controlled in each case to be 0.001 inch. Besides the test units whose metal parts were treated as above, other units of identical dimensions whose metal parts were not so treated were used as controls. The units were assembled using as the adhesives (a) pure polyethylene of Example 1 and (b) the polyethylene/high surface alumina adhesive of Example 4. The units were finally assembled by baking in an oven at 175°C. for 30 minutes. All of the test units were then placed in a 400-hour life test in water while subjected to a force resulting in a constant tensile stress of 1800 lb./sq. inch of joint area. Failures occurred with all these metals as follows;

| Adhesive | Failures at Hours |
|---|---|
| Polyethylene (a), metals untreated | 0 to 20 (all failed) |
| Polyethylene (a), metals treated | 10 to 160 (all failed) |
| Polyethylene/alumina (b), metals treated | none failed at 400 hr. |

This example shows the effective pretreatment of substrates at a relatively low temperature with a solution of II, particularly with regard to durability under continuing stress in the presence of moisture.

EXAMPLE 10

Smooth, flat pieces of a sintered alumina ceramic body were used as substrate, these being typical of bases for various electronic devices. Some of these were treated by immersing at 95°–100°C. for 5 minutes in the solution of II used in Example 9, then rinsed and dried. Others not so treated were used as controls. On each of the alumina pieces was applied a strip, 0.050 inch thick, of the polyethylene/high surface alumina adhesive of Example 4 and the strips were baked on at 175°C. for 15 minutes. The adhesive strip could not be detached from any of the test pieces immediately after cooling. After immersion in boiling water for 1 hour, however, the adhesive strips were easily detached from the untreated pieces of the alumina body, leaving virtually no organic polymeric material behind. From the treated substrate pieces, it was not possible to detach the adhesive strips without tearing within the adhesive itself, even after 24 hours more exposure to boiling water.

EXAMPLE 11

An aqueous solution was made containing 2.32% fumaric acid, 0.00373% sodium dichromate, $Na_2Cr_2O_7 \cdot 2H_2O$, (a corrosion inhibiting agent) and sufficient sodium bicarbonate was added to raise the pH to 5.0. To this was added 1/80 of its volume of the solution of II of Example 6. There resulted a small decrease in pH, and the pH was readjusted to 5.0. There resulted a clear yellowish-green solution buffered at pH 5.0 by fumaric acid-fumarate at 0.2 mole per liter total and containing $2.5 \times 10^{-4}$ g. atom $Cr^{-6}$ per liter and $6.25 \times 10^{-4}$ g. atom $Cr^{+3}$ per liter, the latter being in Complex II form.

Clean 5 mil aluminum foils were treated 5 minutes in this solution at 95°–100°C., then rinsed and dried. Similar clean aluminum foils not so treated were used as controls. Peel test specimens were prepared with these foils as in Example 1, except that the adhesives used were a pure polypropylene, melt index 10.5; and the same containing also 5% of the dispersed alumina of Example 4. The peel specimens were assembled in a press for 5 minutes at 175°C. Peel strength tests on the specimens were made as in Example 1, with the following results:

| Adhesive | Peel Strength, lb./in. |
|---|---|
| Polypropylene on untreated metal | 0 (fell apart) |
| Polypropylene/alumina on untreated metal | 1.9 |
| Polypropylene on treated metal | 0.4 |
| Polypropylene/alumina on treated metal | 23.5 |

EXAMPLE 12

Peel tests were made on aluminum foils pretreated as in Example 11 and joined together by several various polymers which did not (a) and did (b) contain 5% dispersed high surface alumina of Example 4. The polymers used were of types which adhere poorly or not at all to metals. Peel test results were as follows:

| Adhesive | Peel Strength, lb./in. | |
|---|---|---|
| | (a) | (b) |
| A tetrafluoroethylene/hexafluoropropylene copolymer | 0.1 | 8.4 |
| An 86% vinyl chloride, 13% vinyl acetate, 1% dibasic acid copolymer | 0 | 12.7 |
| A commercial bisphenol A polycarbonate | 0 | 3.8 |
| A commercial polysulfone* | 0.5 | 1.1 |
| A butadiene/styrene copolymer | 2.7 | 27.6 |

* Made by reaction of the disodium salt of 4,4'-dispropylidene diphenol with 4,4'-dichlorodiphenyl sulfone.

Similar peel tests were made on aluminum foils pretreated as in Example 11 and joined together with B. F. Goodrich Estane 5701 F1 linear polyurethane (M.I. 8.0 at 190°C.) and with DuPont Hytrel linear polyester (M.I. 1.8 at 230°C.). Bonding was accomplished at 195°C. with polyurethane and at 220°C. with polyester. The polyurethane was tested with and without 5% alumina dispersed therein; and polyester only without alumina. Improvement in adhesion was found in each case:

| Adhesive | Peel Strength, | lb./in. |
|---|---|---|
| Polyurethane | 17 | 26 |
| Polyurethane plus 5% $Al_2O_3$ | 29 | 44 |
| Polyester | 8 | 15 |

EXAMPLE 13

Peel tests were made on 5 mil aluminum foils using as the polymer a commercial grade of unstabilized low density (0.9201) polyethylene (a), made by coordination catalysts at low pressure with a butene-1 comonomer, melt index 1.40. Samples were prepared with both untreated aluminum and aluminum treated with II as in Example 6. The procedure was that of Example 11 except that the press temperature was 170°C., instead of 175°C. as in Example 11.

Similar tests with treated and untreated aluminum were made using polymer (a) having dispersed therein 5% of the alumina of Example 4, the blend being referred to as (b). Peel test results were as follows:

| Adhesive | Peel Strength, lb./in. | |
|---|---|---|
| | Untreated Aluminum | Aluminum Treated with II |
| (a) PE | 0.3 | 24.9 |
| (b) PE, alumina | 15.5 | 80* |

* Aluminum broke at 80 lb./in., similar test with 7-mil aluminum gave 121.0 lb./in. peel strength.

EXAMPLE 14

In this example a substituted fumaric acid was employed to form an adhesion promoting compound analogous to Type II, which uses fumaric acid. Here, methyl fumaric acid (mesaconic acid) was used. A solution of 10.00 g. $Cr(NO_3)_3 \cdot 9H_2O$ (0.025 mole) and 6.50 g. mesaconic acid (0.05 mole) in 500 ml. water was held at 100°C. for 30 minutes and then cooled to 24°C. The resultant blue solution had a pH of 1.24. To this was added 17.00 ml. of 1.000 molar $NaHCO_3$, which raised the pH to 1.61. The solution was held at 100°C. for 60 minutes, then cooled to 24°C. (pH 1.30). To this was added 16.50 ml. of 1.000 molar NaHCO$_3$, raising the pH to 1.75. The solution was held at 100°C. for 60 minutes again, then cooled to 24°C. The solution (pH 1.50) had become green. At this point it was calculated from NaHCO$_3$ additions and pH that total Na$^+$ plus H$_3$O$^+$ equalled 0.098 mol/liter, which approximates the theoretical total monovalent cation necessary to form a complex with 0.05 g. atom Cr$^{3+}$/liter in the solution. The color of the mesaconate resembled that of the Type II fumarate, although the green was not quite as clean a green.

Two samples of 5 mil aluminum foil were treated for five minutes in a solution of 1 volume of mesaconate and 1 volume of water, which had a pH of 2.30, one at 100°C. and one at 24°C., and then rinsed. In each case, adhesion of a polyethylene/alumina sandwich as described in Example 1 was excellent (peel strength 33 lb./in.), and was similar to the results with Type II fumarate.

EXAMPLE 15

In this example Type I was used to promote the adhesion of polyvinylbutyral compositions to glass. Polyvinylbutyral was prepared by the reaction of butyraldehyde and polyvinyl alcohol; remaining unreacted alcohol groups were calculated as weight percent vinyl alcohol. The polyvinyl butyral employed here had 23% vinyl alcohol. An interlayer composition was made containing that polyvinylbutyral and 31.5% triethylene glycol di(2-ethyl butyrate) plasticizer.

The glass used was 150 -inch thick float glass (i.e., it was formed by floatation on a molten bath of tin), washed with demineralized water. A laminate was prepared from a sandwich of glass-interlayer composition-glass, subjected to conventional heat and pressure conditions.

Adhesion values reported below were determined by compressive shear techniques, i.e., 1-inch squares of laminate, cut with a diamond saw from a larger lamination, were placed in a jig which held the sample at a 45°angle from horizontal. A vertical force was applied (0.1-inch per minute) to the jig; the force required to shear the bond between the glass and the interlayer was measured (pounds of force per square inch of laminate sample).

Prior to laimination according to this example, several 30-mil thick plasticized polyvinylbutyral sheets as described above were hung in conditioning rooms at 20, 35 and 50% relative humidity. The moisture content of the respective sheets at the time of lamination was determined to be about 0.4, 0.8 and 1.2%, respectively. The ⅛-inch glass sheets described above were treated with an aqueous solution of Type I having an approximate chromium content of 0.075%. As a control, laminates in which the glass had not been treated with Type I were also prepared. The compressive shear strength determinations on the resulting laminates with and without Type I treatment indicate that the laminates employing glass sheets treated with Type I showed a flatter response of adhesion to moisture than did the control laminates. The data are as follows. For the treated laminates, the results were about 2600, 2200 and 1900 pounds per square inch at 0.4, 0.8 and 1.2% interlayer moisture, respectively; for the untreated controls the results were about 3600, 2200 and 1050 pounds per square inch at 0.4, 0.8 and 1.2% interlayer moisture, respectively.

Another embodiment of this invention is compositions comprising complexes in an alcoholic (having 2-4 carbon atoms) or tetrahydrofuran solution, of chromium nitrate with fumaric acid, aconitic acid, or mesaconic acid, the approximate molar ratio of said acid to chromium nitrate preferably being in the range of 0.2:1 to 1:1. Lower ratios of acid to chromium are not as useful as adhesion promoters and higher ratios are subject to gelation during storage. The preferred ratio is about 0.5 mole acid per mole of chromium (III) nitrate, and the preferred acid is fumaric. Such compositions are useful coupling agents for borosilicate glass fibers and polyethylene. These nonaqueous compositions may be designated "Type A" solutions to distinguish them from aqueous solutions of Types I and III, to which they are generally similar in light absorption and adhesion-promoting activity. It is possible that Type A contains more highly "olated" species than do Types I and III, but such a difference has not been demonstrated to influence their utility either adversely or beneficially. They are prepared most conveniently by admixing chromium nitrate nonahydrate with tetrahydrofuran or an alcohol having 2–4 carbon atoms in proportions such that the resultant solution contains less than 10% water and adding organic acids to the resulting solution. The reaction takes place spontaneously in the alcoholic or certain other polar, organic medium. Alternately, the preparation can start by adding a concentrated aqueous solution of CrO$_3$ to a solution of nitric acid in organic medium; the CrO$_3$ is initially reduced to Cr(III) nitrate by the organic medium. The Type A product containing one mole of fumaric acid per gram atom of chromium has two light absorption maxima, at about 4110A and 5730A, respectively. Preparation of Type A complexes is described in copending commonly assigned application Ser. No. 119,842, filed March 1, 1971, by Charles C. Cumbo now abandoned in favor of continuation-in-part application Ser. No. 377,570, filed July 9, 1973.

It is believed that all of the products described herein, such as Types I, II, III, and A, can contain mixtures of two or more chromium complexes and may not be pure chemical species, although a particular species may predominate in each product. Various degrees of polymerization, by means of dicarboxylic acid linkages may also exist in these products.

The following example is given to illustrate the preparation and use of Type A nonaqueous complexes.

EXAMPLE 16

Chromium nitrate nonahydrate (8.0 g., 0.02 moles) was dissolved in 100 cc. of anhydrous ethanol, producing a blue-violet solution. The reaction was allowed to proceed. for 170 minutes at room temperature (+25°C.). At the end of this time, the color of the solution was dark green. The progress of the reaction was monitored by periodically removing 3 ml. aliquots, diluting to 25 ml. with water and determining the hydrogen ion concentration. The results are presented below in Table II; the shift in pH indicates the olation of Cr(III) nitrate.

TABLE II

| Time (min.) | pH |
|---|---|
| 10 | 2.70 |
| 30 | 2.25 |
| 50 | 2.15 |
| 90 | 1.95 |
| 170 | 1.90(equilibrium value) |

At the end of 170 minutes, 0.02 moles of fumaric acid were added. The acid reacted rapidly, producing a dark blue solution. Sodium ethoxide (0.02 mole; 20 cc. of a 1.0 N solution) was added to complete the reaction. Examination of the visible spectrum in an aqueous solution of the reaction products gave the following results:

4110A, $\epsilon_1$ 29.0
5730A, $\epsilon_2$ 32.0

The above complex, when used as a coupling agent, gave borosilicate glass fiber polyethylene composites with high flexural strength and resistance to moisture. Such composites were formed, for example, by dipping borosilicate glass fibers in a chromium complex solution containing 0.05–0.2% chromium allowing to dry, making a multilayer structure of alternate layers of treated glass fiber fabric and polyethylene powder, and pressing the structure at about 860 psi and 175°C. during a period of about 2 minutes.

EXAMPLE 17

This example illustrates the preparation of a nonaqueous (Type A) complex having 0.6 moles of fumarate per mole of chromium.

Chromium nitrate nonahydrate (231 g., 0.58 moles) was dissolved in 2380 grams of isopropyl alcohol. The solution was heated to 40°C. and held at this temperature for 30 minutes, at which time Sample A, which was olated chromium nitrate in isopropanol, was taken. Fumaric acid (33.5 g., 0.29 mole) was then added and the solution stirred and heated at 40°C. for an additional 10 minutes. The solution was cooled to 25°C. and Sample B was taken.

This product contained 1.14% chromium. Spectral data obtained by diluting 3 ml. samples to 25 ml. with water showed the following absorption maxima and molar absorbances.

| Sample | $\gamma_1$ | $\epsilon_1$ | $\gamma_2$ | $\epsilon_2$ |
|---|---|---|---|---|
| A | 4200 | 27.7 | 5750 | 18.4 |
| B | 4100 | 27.8 | 5750 | 30.3 |

EXAMPLE 18

This example illustrates the preparation of Type III complex. Chromium nitrate nonahydrate (46.2 g., 0.116 moles) was dissolved in 38 g. of water. While stirring the solution, 10.9 g. (0.136 moles) of 50% aqueous sodium hydroxide were added, keeping the temperature below 40°C. by the use of external cooling. Some solids were observed in the solution at this point. The temperature was then raised to reflux (106°C.) and held there for 15 minutes. The precipitate dissolved and the solution turned green. Fumaric acid (6.7 g., 0.058 mole) was added and refluxing was continued for another 15 minutes. The solution was cooled to 25°C. and filtered to remove a small amount, less than 0.1 g., of insoluble matter. The resulting solution was blue and was found by analysis to contain 5.9% chromium. The pH of this solution was 0.06.

A sample of this solution was diluted in water to 0.05 molar chromium and the light absorption spectrum determined on a Carey Model 11 Spectrophotometer. The resulting spectrum had absorption maxima at 4100 and 5700A with molar absorbances of 25.3 and 25.7, respectively.

After two weeks of storage at 45°C. the product solution was still fluid and free of solids. The molar absorbances had increased to 26.7 each.

After two months at room temperature, the molar absorbances had changed to 25.0 and 25.8, respectively.

Glass fiber-polyethylene composites may be prepared using this product in the procedure described in Example 16.

The broad band absorption spectra reported herein were determined at a scanning rate of 300A/minute, on Carey Spectrophotometers. The spectra of Table 1 were determined on a Model 14, and the spectra of Examples 16–18 on a Model 11.

EXAMPLE 19

To 101 mg. (0.001 mole) of $CrO_3$ was added, with stirring, 3.8 ml. of 0.92 normal $DNO_3$ in $D_2O$ (0.0035 equivalents of $DNO_3$), followed by the dropwise addition of 0.6 ml. of 25% $D_2O_2$ in $D_2O$. The solution was refluxed for 30 minutes to ensure complete reaction as well as the decomposition of excess $D_2O_2$. The solution was cooled to room temperature and 1.12 ml. of 1.52 normal NaOD in $D_2O$ (0.0017 equivalents of NaOD) was added. The solution was refluxed 15 minutes to ensure complete olation of the chromium nitrate. Fumaric acid-$D_2$ (59.4 mg., 0.005 mole) was added to the reaction mixture and refluxing continued for an additional 15 minutes to produce the Type III complex. The infrared spectrum of this solution was determined on a Perkin-Elmer Model 21 recording infrared spectrophotometer using a slit width of 128$\mu$, a gain of 6, automatic suppressor setting of 3 and a response setting of 4. The infrared cells were an accurately matched pair with windows of zinc sulfide and a precision path length of 0.2 mm. These cells are available as Irtran-2 from Barnes Engineering Co., Stamford, Conn.

Figure 2:
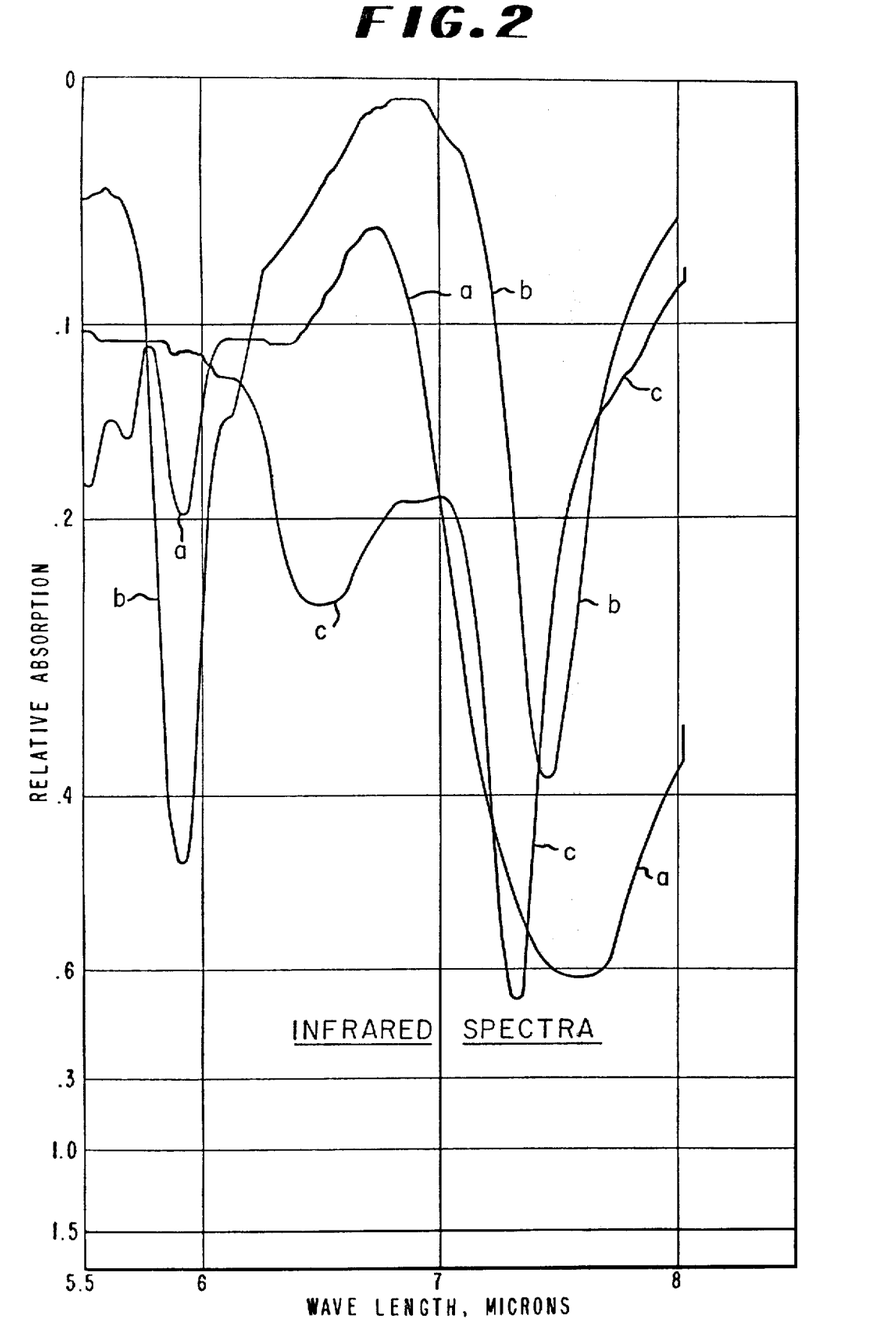
FIG. 2 shows infrared spectra of Type III and several standards.

The infrared spectrum is seen in FIG. 2a, and shows that 90% of the carboxyl (COOH) groups are directly coordinated to chromium since only 10% of the carboxyl groups remain unreacted. The amount of uncomplexed carboxyl groups were determined by comparing the intensity of the >C=O band (5.92$\mu$) with that of known standards. FIG. 2b shows the spectrum of fumaric acid-$d_2$; >C=O at 5.92$\mu$. FIG. 2c shows the spectrum of disodium fumarate; >C=O at 6.5$\mu$.

To 1 ml. of the Type III solution prepared above was added 0.1 ml. of 0.92 normal $DNC_3$ in $D_2O$. The IR spectrum of the resulting solution showed no change in the carboxyl region of the spectrum, indicating that there are essentially no free carboxylate ($COO^-$) groups present in such Type III solutions.

The deuterated reagents used in this example were obtained from Alpha Inorganics, Inc., Beverly, Mass.

Another embodiment of this invention is compositions comprising polymeric compounds consisting of fumarato chromium (III) nitrate, aconitato chromium (III) nitrate, and mesaconato chromium (III) nitrate. Such compositions are useful for promoting adhesion to metal, metal oxide and glass substrates, especially glass substrates. By polymeric species it is meant that the complex contains more than one chromium atom. These polymers may be formed by linkage through the dicarboxylic acids or by various oxygen linkages as are generally described by Laswick and Plane, Journal of American Chemical Society, Vol. 81, pages 3564 to 3567, 1959; Hall and Eyring, Journal of American Chemical Society, Vol. 72, pages 782–790, 1950; and Bailar, Chemistry of the Coordination Compounds, pages 448 to 471, Reinhold Publishing Corporation, New York, 1956.

I claim:

1. The method of treating a metal, metal oxide or glass substrate to improve the subsequent bonding thereto of an organic polymer, said method comprising contacting said substrate with the aqueous solution of a composition comprising one or more water-soluble coordination complexes of (a) chromium (III) derived from a water-soluble salt thereof with a noncoordinated anion, which salt yields $Cr(H_2O)_6^{3+}$ in water; with (b) a trans-acid of the formula wherein $R_1$ and $R_2$ are the same or different and are H, alkyl, $-CH_2COOH$ or phenyl; provided that the total number of carbon atoms in said trans-acid is an integer in the range 4–10, inclusive, said composition being selected from the group consisting of
  a. complexes whose aqueous solutions have a purple-blue color and give a characteristic broad band light absorption spectrum having maxima at about 5750 A and 4120 A, said noncoordinated anion being nitrate (Type I);
  b. complexes whose aqueous solutions have a clear medium green color and give a characteristic broad band light absorption spectrum having maxima at about 5850 A, 4300 A and 3620 A (Type II); and
  c. complexes whose aqueous solutions have a blue color and give a characteristic broad band light absorption spectrum having maxima at about 5700 A and 4120 A, said noncoordinated anion being nitrate (Type III);

and drying the substrate wet with said solution.

2. The method of claim 1 wherein said trans-acid is fumaric acid.

3. A method according to claim 1 wherein the aqueous solution contains one or more chromium (III)/fumaric acid coordination compounds selected from the group consisting of compounds of the approximate formulae:

(Type I), and (Type III), wherein X is the said noncoordinated anion, said aqueous solution having a pH of 0.2 to 4 and a concentration of said Type I or Type II compounds equivalent to about from 0.0005 to 0.5 gram atoms of chromium per liter.

4. A method according to claim 3 wherein the selected compound is that identified in Type I.

5. A method according to claim 3 wherein the substrate is glass.

6. The method of forming a composite article comprising a base metal, metal oxide or glass substrate having adhesively bonded thereto an organic polymer, said method comprising treating said substrate by the method of claim 1, and then applying said polymer to said substrate.

7. The method of claim 6, wherein the polymer that is applied to the substrate has dispersed therein 0.4 to 10% by weight of a finely divided alumina having a combined water content not exceeding about 9% by weight and a specific surface area of at least 5 square meters per gram.

8. The method of claim 6 wherein the substrate is from the group consisting of aluminum, iron, steel, stainless steel, copper, brass, titanium, magnesium, nickel, tin, tin plate, zinc, zinc plate, aluminum oxide, titanium oxide and glass; and the polymer is from the group consisting of polyethylene, polypropylene, ethylene/vinyl acetate copolymers, polyvinylidene fluoride, vinyl chloride/vinyl acetate copolymers, polycarbonates, polysulfones, polyamides, polyesters and butadiene/styrene copolymers.

9. The method of claim 6 wherein the substrate is glass.

10. The method of treating a metal or metal oxide substrate to improve the subsequent bonding thereto of an organic polymer, said method comprising contacting said substrate with an aqueous solution of the composition comprising one or more water-soluble coordination complexes of (a) chromium (III) derived from a water-soluble salt thereof with a noncoordinated anion, which salt yields $Cr(H_2O)_6^{3+}$ in water; with (b) a trans-acid of the formula wherein $R_1$ and $R_2$ are the same or different and are H, alkyl, $-CH_2COOH$ or phenyl; provided that the total number of carbon atoms in said trans-acid is an integer in the range 4–10, inclusive, wherein said trans-acid is fumaric acid and the noncoordinated anion is nitrate, and wherein aqueous solutions of said complex have a clear medium green color and give a characteristic broad band light absorption spectrum having maxima at about 5850A, 4300A and 3620A, then rinsing the substrate to remove therefrom all soluble residues of the treating solution.

11. A method according to claim 10 wherein the aqueous solution contains a chromium (III)/fumaric acid coordination compound of the approximate formula:

(Type II)

wherein X is the said noncoordinated anion, said aqueous solution having a pH either in the range of 1 to 2.4 or in the range of 3.0 to 5.5 and a concentration equivalent to about from 0.0001 to 0.1 gram atom of chromium per liter.

12. The method of forming a composite article comprising a base metal or metal oxide substrate having adhesively bonded thereto an organic polymer, said method comprising treating said substrate by the method of claim 10, and then applying said polymer to said substrate.

13. The method of claim 12, wherein the polymer that is applied to the substrate has dispersed therein 0.4 to 10% by weight of a finely divided alumina having a combined water content not exceeding about 9% by weight and a specific surface area of at least 5 square meters per gram.

14. The method of claim 12 wherein the substrate is from the group consisting of aluminum, iron, steel, stainless steel, copper, brass, titanium, magnesium, nickel, tin, tin plate, zinc, zinc plate, aluminum oxide and titanium oxide; and the polymer is from the group consisting of polyethylene, polypropylene, ethylene/vinyl acetate copolymers, polyvinylidene fluoride, vinyl chloride/vinyl acetate copolymers, polycarbonates, polysulfones, polyamides, polyesters and butadiene/styrene copolymers.

15. A composite article comprising a metal or metal oxide or glass substrate having bonded thereto an organic polymer through a thin layer of the composition comprising one or more water-soluble coordination complexes of (a) chromium (III) derived from a water-soluble salt thereof with a noncoordinated anion, which salt yields $Cr(H_2O)_6^{3+}$ in water; with (b) a trans-acid of the formula wherein $R_1$ and $R_2$ are the same or different and are H, alkyl, —CH$_2$COOH or phenyl; provided that the total number of carbon atoms in said trans-acid is an integer in the range 4–10, inclusive, said composition being selected from the group consisting of
 a. complexes whose aqueous solutions have a purple-blue color and give a characteristic broad band light absorption spectrum having maxima at about 5750 A and 4120 A, said noncoordinated anion being nitrate (Type I);
 b. complexes whose aqueous solutions have a clear medium green color and give a characteristic broad band light absorption spectrum having maxima at about 5850 A, 4300 A and 3620 A (Type II); and
 c. complexes whose aqueous solutions have a blue color and give a characteristic broad band light absorption spectrum having maxima at about 5700 A and 4120 A, said noncoordinated anion being nitrate (Type III).

16. A composite article according to claim 15 wherein the coordination complexes include one or more chromium (III)/fumaric acid coordination compounds selected from the group consisting of compounds of the approximate formulae:

(Type I), and (Type III)

wherein X is the said noncoordinated anion.

17. A composite article of claim 16 wherein the selected compound is that identified as Type I.

18. A composite article of claim 16 wherein the organic polymer is polyvinyl butyral.

19. A composite article according to claim 16 wherein the polymer has dispersed therein 0.4 to 10% by weight of a finely divided alumina having a combined water content not exceeding about 9% by weight and a specific surface area of at least 5 square meters per gram.

20. A composite article according to claim 16 wherein the substrate is from the group consisting of aluminum, iron, steel, stainless steel, copper, brass, titanium, magnesium, nickel, tin, tin plate, zinc, zinc plate, aluminum oxide, titanium oxide and glass; and the polymer is from the group consisting of polyethylene, polypropylene, ethylene/vinyl acetate copolymers, polyvinylidene fluoride, vinyl chloride/vinyl acetate copolymers, polycarbonates, polysulfones, polyamides, polyesters and butadiene/styrene copolymers.

21. A composite article according to claim 20 wherein the substrate is glass.

22. A composite article according to claim 15 wherein the coordination complexes are present as an absorbed layer, and they include a chromium (III)/fumaric acid coordination compound of the approximate formula:

(Type II)

wherein X is the said noncoordinated anion.

23. A composite article according to claim 22 wherein the polymer has dispersed therein 0.4 to 10% by weight of a finely divided alumina having a combined water content not exceeding about 9% by weight and a specific surface area of at least 5 square meters per gram.

24. A composite article according to claim 22 wherein the substrate is from the group consisting of aluminum, iron, steel, stainless steel, copper, brass, titanium, magnesium, nickel, tin, tin plate, zinc, zinc plate, aluminum oxide and titanium oxide; and the polymer is from the group consisting of polyethylene, polypropylene, ethylene/vinyl acetate copolymers, polyvinylidene fluoride, vinyl chloride/vinyl acetate copolymers, polycarbonates, polysulfones, polyamides, polyesters and butadiene/styrene copolymers.

25. A composite article of claim 15 wherein the organic polymer is polyvinyl butyral.

26. A method of treating a metal or metal oxide substrate to improve the subsequent bonding thereto of an organic polymer, said method comprising contacting said substrate, for a sufficient time to produce an improvement in adhesion, with an aqueous solution of (a) a trans-1,2-ethylene dicarboxylic acid having 4 to 10 carbon atoms and (b) a water soluble chromium (III) salt which gives $Cr(H_2O)_6^{+3}$ in solution; said aqueous solution being held at a temperature in the range of about 90°–100°C. and having a pH in the range of about 1.8–2.4.

27. A method according to claim 26 wherein said acid is fumaric acid.

28. A method according to claim 26 wherein said acid is mesaconic acid.

29. A method according to claim 26 wherein said substrate is contacted with said solution for up to about 5 minutes.

30. A method according to claim 26 wherein said water-soluble chromium (III) salt is chromium (III) nitrate.

* * * * *